(12) United States Patent
Ying

(10) Patent No.: US 12,252,209 B2
(45) Date of Patent: Mar. 18, 2025

(54) SCOOTER

(71) Applicant: INVANTI (BEIJING) TECHNOLOGY CO., LTD, Beijing (CN)

(72) Inventor: Gang Ying, Yongkang Jinhua (CN)

(73) Assignee: Invanti (Beijing) Technology Co., Ltd., Beijing (CN)

( * ) Notice: Subject to any disclaimer, the term of this patent is extended or adjusted under 35 U.S.C. 154(b) by 448 days.

(21) Appl. No.: 17/627,172

(22) PCT Filed: Sep. 29, 2020

(86) PCT No.: PCT/CN2020/118668
§ 371 (c)(1),
(2) Date: Jan. 14, 2022

(87) PCT Pub. No.: WO2021/073422
PCT Pub. Date: Apr. 22, 2021

(65) Prior Publication Data
US 2022/0266941 A1    Aug. 25, 2022

(30) Foreign Application Priority Data

Oct. 15, 2019  (CN) .......................... 201910976286.X

(51) Int. Cl.
*B62K 15/00*    (2006.01)
*B62K 3/00*    (2006.01)

(52) U.S. Cl.
CPC ............ *B62K 15/006* (2013.01); *B62K 3/002* (2013.01)

(58) Field of Classification Search
CPC .............................. B62K 15/006; B62K 3/002
See application file for complete search history.

(56) References Cited

U.S. PATENT DOCUMENTS 7,954,831 B1 * 6/2011 Yeh ......................... B62K 15/00
                                                                                 280/14.28
12,060,132 B2 * 8/2024 Vaney .................... B62K 3/002
(Continued)

FOREIGN PATENT DOCUMENTS

| CN | 203268267 U | 11/2013 |
| CN | 104118510 A | 10/2014 |
| CN | 108502072 A | 9/2018 |

(Continued)

OTHER PUBLICATIONS

International Search Report, China National Intellectual Property Administration, Dec. 15, 2020.

*Primary Examiner* — Kevin Hurley
(74) *Attorney, Agent, or Firm* — Bay State IP, LLC

(57) ABSTRACT

A scooter includes a front fork, a folding sleeve, a folding core, a folding seat, a folding lock and a folding pin. The folding seat is fixed on the front fork, a lower portion of the folding core is rotatably connected into the folding seat by means of the folding pin in a folding manner, the folding sleeve is arranged outside the folding seat in a sheath manner, a sliding rail is arranged in the folding sleeve, a lock catch assembly is arranged on a middle portion of the folding core, a folding fastener matching the lock catch assembly is arranged on a front portion of a footboard, the folding lock is arranged on an upper portion of the folding core in a sheath manner, and the folding lock is provided with a sliding shaft.

6 Claims, 4 Drawing Sheets

(56) References Cited

U.S. PATENT DOCUMENTS

2002/0180169 A1   12/2002  Kwok
2023/0112111 A1*   4/2023  Fitzwater ............... B62K 21/18
                                                      280/87.041

FOREIGN PATENT DOCUMENTS

| | | |
|---|---|---|
| CN | 109131687 A | 1/2019 |
| CN | 209274807 U | 8/2019 |
| CN | 110979533 A | 4/2020 |
| CN | 211167246 U | 8/2020 |
| KR | 20170141430 A | 12/2017 |

* cited by examiner

SCOOTER

CROSS REFERENCE TO RELATED APPLICATION

This application is for entry into the U.S. National Phase from which priority is claimed under all applicable sections of Title 35 of the United States Code including, but not limited to, Sections 120, 363, and 365(c) to International Application No. PCT/CN2020/118668 filed on Sep. 29, 2020, and which in turn claims priority under 35 USC 119 to Chinese Patent Application No. 201910976286.X filed on Oct. 15, 2019.

TECHNICAL FIELD

The present disclosure relates to the field of water quality monitoring, and in particular to a scooter.

BACKGROUND

As a new type of transportation tool, scooter has a rapid growth in the export market in recent years. Its portability and lightweight are welcomed by most users. It has become one of the new travel tools after bicycle. The folding devices of existing scooters generally employ a link rod or lock pin mechanism to realize folding. For the electric scooters employing the link rod and lock pin mechanism, the folding mechanism has a great number of parts, thus the accumulative tolerance enables certain gap between the folding and unfolding states; because of the special headset position of the scooter, the gap will be magnified 10-20 times at the handle end, causing the handle to shake during the driving process. Moreover, most scooters cannot be folded under the pressure of their own weights; generally, users need to shake the handles and fold the scooters with force. In addition, existing electric scooters have a disordered wiring and are uneasy to use and maintain.

SUMMARY

In view of the defects in exiting technologies, the present disclosure aims to provide a scooter which is easy to fold and has neat wiring.

In order to achieve the above aim, the present disclosure employs the following technical scheme.

A scooter, including a front fork, wherein the scooter further includes a folding sleeve, a folding core, a folding seat, a folding lock and a folding pin, wherein the folding seat is fixed on the front fork, a lower portion of the folding core is rotatably connected into the folding seat by means of the folding pin in a folding manner, the folding sleeve is arranged outside the folding seat in a sheath manner, a sliding rail is arranged in the folding sleeve, a lock catch assembly is arranged on a middle portion of the folding core, a folding fastener matching the lock catch assembly is arranged on a front portion of a footboard, the folding lock is arranged on an upper portion of the folding core in a sheath manner, and the folding lock is provided with a sliding shaft; during folding, the folding lock is rotated to enable the sliding shaft to be clamped into the sliding rail, and the folding sleeve is pulled upwards to enable the sliding shaft to vertically slide along the sliding rail, then the folding sleeve drives the folding core to be folded and rotated to fix the lock catch assembly on the folding core to the folding fastener in a buckle manner.

Further, the lock catch assembly includes a folding column and a folding hook, the folding hook is provided with a bending hook at a front portion and defines a limit notch at a rear portion, the bending hook and the folding fastener are moveably buckled, the folding column is transversely clamped in the limit notch, and two ends of the folding column are fixed on the middle portion of the folding core.

Further, the scooter further includes a hooking piece and a spring, an upper portion of the hooking piece is fixed at the center of the folding column of the lock catch assembly, the folding pin is provided with a thin hooking rod on a middle portion, one end of the spring is fixed below the hooking piece and the other end is fixed on the thin hooking rod.

Further, the sliding shaft is provided with a ball at a front portion, and the folding core defines a circular hole for the ball to clamp into.

Further, the folding lock is provided with a plane on left and right sides and provided with a circular arc surface on front and rear sides, the circular arc surface is provided with a plurality of protruded ribs, and the sliding shaft is arranged on the middle protruded rib on the circular surface at the two sides.

Further, the folding fastener defines a fastener hole at a front portion and is provided with a fixing column at a rear portion, and the fixing column is connected to the front portion of the footboard.

Further, the hooking piece is an eyebolt having a circular ring arranged at a lower portion thereof.

Further, the folding core defines an opening on two sides of the middle portion, two ends of the lock catch assembly are inserted and fixed in the opening, the folding core is provided with an extending plate on two sides of a lower portion, and the extending plate defines a folding pin hole at a lower portion.

Further, the folding seat defines an opening towards the folding direction of the folding core.

Further, the front fork includes a front fork inner tube, the folding seat is installed on the front fork inner tube, the folding core defines a vertical wiring conduit that is communicated with the front fork inner tube, and the front fork inner tube defines a wire outlet towards the footboard.

Further, the folding core has an upper end connected to a vertical tube, and the vertical tube is used for connecting to a handle.

With the technical scheme of the present disclosure, the following benefits can be achieved. Compared with existing technologies, the scooter provided by the present disclosure is rapid and easy to fold and unfold, most parts are of a dual-functional structure, the number of part structures is small, the structure is skillful, the locking firmness is high after the scooter is folded, the wiring is neat, and the maintenance and assembly are convenient and fast.

Figure 1:
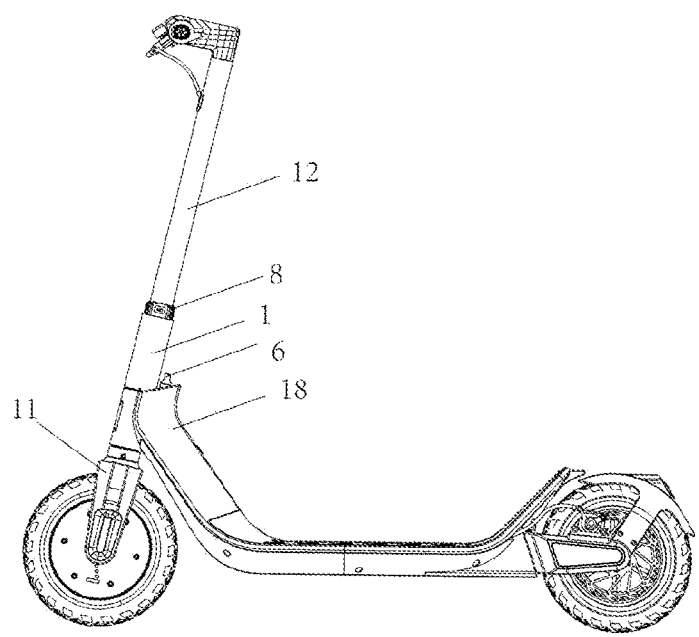
FIG. 1 is a structure diagram of a scooter provided by the present disclosure.

In the drawings, 1 represents a folding sleeve, 2 represents a hooking piece, 3 represents a folding pin, 4 represents a folding column, 5 represents a folding hook, 6 represents a folding fastener, 7 represents a folding core, 8 represents a folding lock, 9 represents a folding seat, 10 represents a folding pin hole, 11 represents a front fork, 12 represents a vertical tube, 13 represents a front fork inner tube, 14 represents a central hole, 15 represents a spring, 16 represents a sliding rail, 17 represents a sliding shaft, 18 represents a footboard, 19 represents a circular ring, 20 represents a thin hooking rod, 21 represents a limit screw, and 22 represent a long hole.

DETAILED DESCRIPTION

The specific scheme and specific embodiments of the present disclosure are further illustrated below in conjunction with accompanying drawings.

Figure 2:
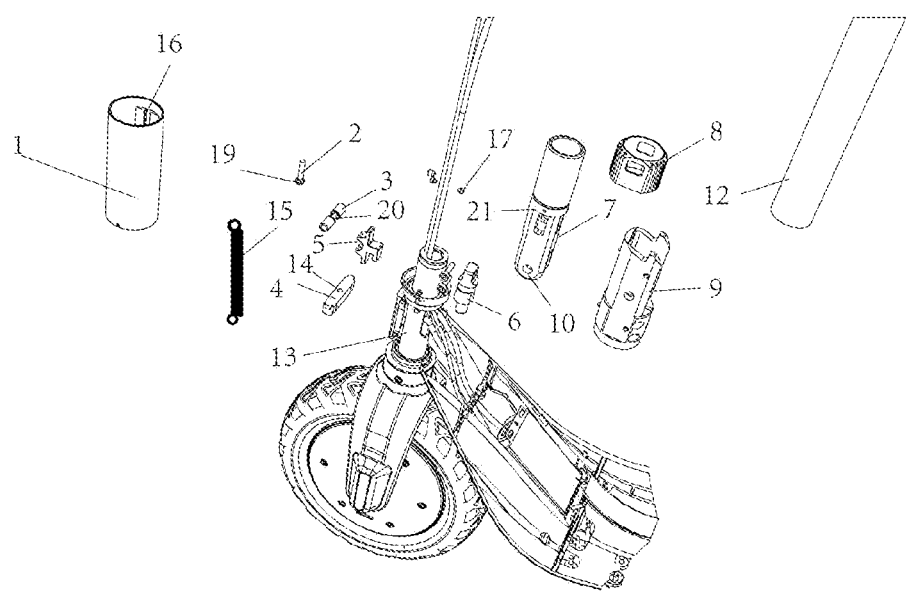
FIG. 2 is a partial exploded view of a scooter provided by the present disclosure.
Figure 5:
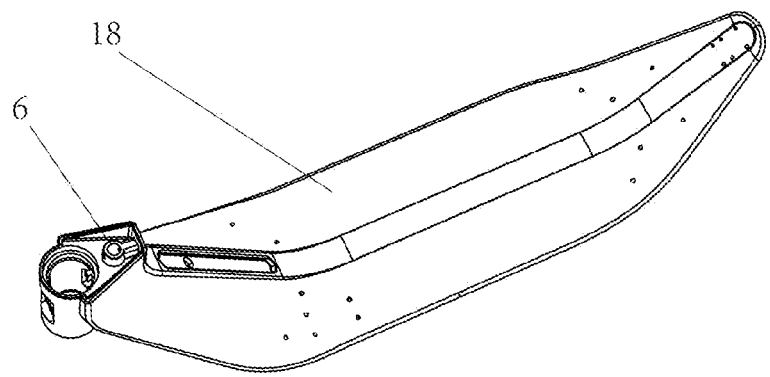
FIG. 5 is a structure diagram of a footboard provided by the present disclosure.

As shown in FIG. 1 and FIG. 2, a scooter includes a front fork 11, wherein the scooter further includes a folding sleeve 1, a folding core 7, a folding seat 9, a folding lock 8 and a folding pin 3, wherein the folding seat 9 is fixed on the front fork 11, a lower portion of the folding core 7 is rotatably connected into the folding seat 9 by means of the folding pin 3 in a folding manner, the folding sleeve 1 is arranged outside the folding seat 9 in a sheath manner, a sliding rail 16 is arranged in the folding sleeve 1, a lock catch assembly is arranged on a middle portion of the folding core 7, a folding fastener 6 matching the lock catch assembly is arranged on a front portion of a footboard 18, as shown in FIG. 5. The folding lock 8 is arranged on an upper portion of the folding core 7 in a sheath manner, and the folding lock 8 is provided with a sliding shaft 17; during folding, the folding lock 8 is rotated to enable the sliding shaft 17 to be clamped into the sliding rail 16, and the folding sleeve is pulled upwards to enable the sliding shaft to vertically slide along the sliding rail 16, then the folding sleeve 1 drives the folding core 7 to be folded and rotated to fix the lock catch assembly on the folding core 7 to the folding fastener 6 in a buckle manner. The folding and rotating means that the folding core 7 is rotated towards the footboard 18.

The folding core 7 defines an opening on two sides of the middle portion, two ends of the lock catch assembly are inserted and fixed in the opening, the folding core 7 is provided with an extending plate on two sides of a lower portion, and the extending plate defines a folding pin hole 10 at a lower portion.

Figure 3:
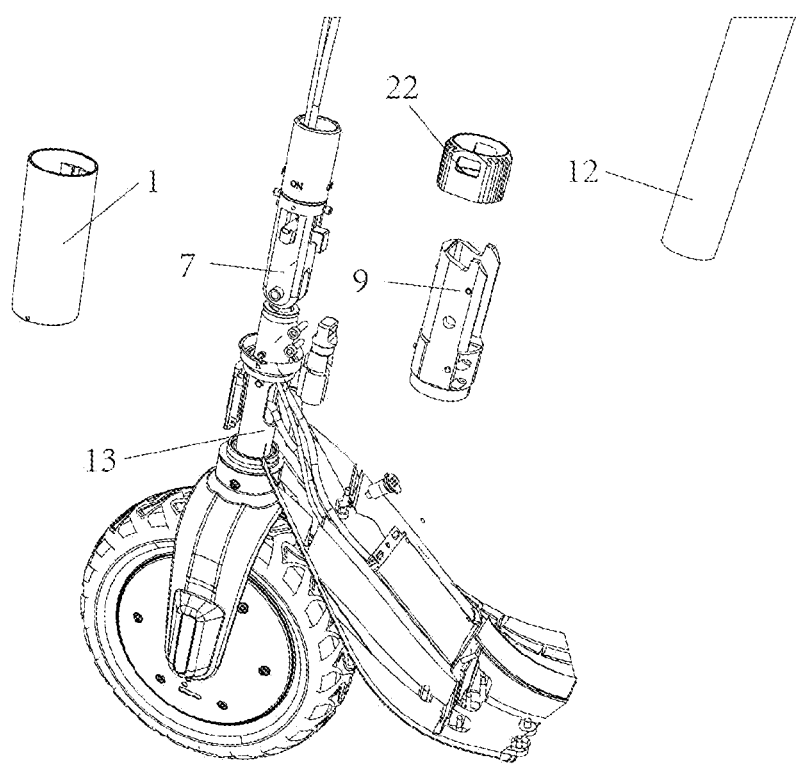
FIG. 3 is another partial exploded view of a scooter provided by the present disclosure.

The lock catch assembly includes a folding column 4 and a folding hook 5, the folding hook 5 is provided with a bending hook at a front portion and defines a limit notch at a rear portion, the bending hook and the folding fastener 6 are moveably buckled, the folding column 4 is transversely clamped in the limit notch, and two ends of the folding column 4 are fixed on the middle portion of the folding core 7, as shown in FIG. 3. The folding fastener 6 defines a fastener hole at a front portion and is provided with a fixing column at a rear portion, and the fixing column is connected to the front portion of the footboard 18. The bending hook is a downward bending hook, which can be buckled with the front portion of the folding fastener 6 after folded, the locking mode is convenient and fast. Two ends of the folding column 4 are inserted into the opening of the folding core 7, thereby fixing the folding hook 5 into the folding core 7, meanwhile the folding column 4 is also used for fixing the hooking piece 2. One part achieves dual functions, thereby enabling a skillful design and saving space and materials.

Figure 4:
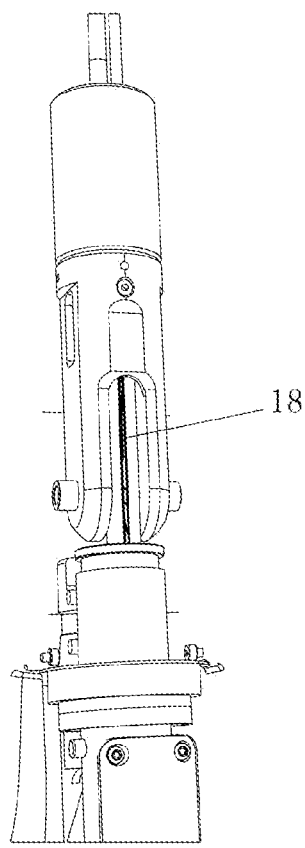
FIG. 4 is a partial structure diagram of a scooter provided by the present disclosure.

The scooter further includes a hooking piece 2 and a spring 15, an upper portion of the hooking piece 2 is fixed in a central hole 14 of the folding column 4 of the lock catch assembly, the folding pin 3 is provided with a thin hooking rod 20 on a middle portion, one end of the spring 15 is fixed below the hooking piece 2 and the other end is fixed on the thin hooking rod 20, as shown in FIG. 4. The hooking piece 2 is an eyebolt having a circular ring 19 arranged at a lower portion thereof. The folding pin is of a barbell type, two ends of which are rotating shafts and the middle portion is thinner, on which the spring 15 can be fixed. The structure is a dual-functional structure and is skillful. The arrangement of the spring 15 enables a buffer function when the folding sleeve 1 is pulled upwards, then the folding sleeve 1 can be pulled upwards gently; furthermore, during unlocking, the folding sleeve 1 can be restored automatically under the action of the pulling force of the spring 15.

The folding core 7 is further provided with a limit screw 21 on the middle portion, an inner surface of the lower portion of the folding sleeve 1 is provided with a protrusion; when the folding sleeve 1 is pulled upwards until the protrusion presses against the limit screw 21, the folding sleeve 1 cannot be pulled up any more, which indicates it is time to conduct the folding operation.

The folding lock 8 is provided with a plane on left and right sides and provided with a circular arc surface on front and rear sides, the circular arc surface is provided with a plurality of protruded ribs, and the sliding shaft 17 is arranged on the middle protruded rib on the circular surface at the two sides. The protruded rib also can slide downwards along the sliding rail 16 and slide together with the sliding shaft to make the sliding smoother. The sliding shaft 17 is provided with a ball at a front portion, and the folding core 7 defines a circular hole for the ball to clamp into. The ball enables the rotation of the folding lock 8 smoother, and when rotated to the circular hole, the ball is clamped into the circular hole to limit the rotation. With a little strength, the ball can be rotated out of the circular hole.

The plane of the folding lock 8 further defines a long hole 22, which increases the friction during rotation, to facilitate the rotation of the folding lock 8.

The folding seat 9 defines an opening towards the folding direction of the folding core 7.

The front fork 11 includes a front fork inner tube 13, the folding seat 9 is installed on the front fork inner tube 13, the folding core 7 defines a vertical wiring conduit that is communicated with the front fork inner tube 13, and the front fork inner tube 13 defines a wire outlet towards the footboard, to enable uniform and smooth wiring.

The folding core 7 has an upper end connected to a vertical tube 12, and the vertical tube 12 is used for connecting to a handle.

When folding the scooter of the present disclosure, just rotate the folding lock 8; upon the hand feels the ball being clamped into the circular hole, the sliding shaft 17 is just clamped into the guide rail. Pull the folding sleeve 1 upwards; when the folding sleeve 1 is pulled upwards until the protrusion presses against the limit screw 21 and cannot be pulled up any more, fold the folding sleeve 1 downwards, then the folding sleeve 1 drives the folding core 7 to bend towards the footboard 18. The folding hook 5 and the folding fastener 6 are buckled and fixed, completing the folding action of the scooter.

It should be noted that the above are preferred embodiments and applied technical principles of the present disclosure merely. Those skilled in the art should understand that the present disclosure is not limited to the specific embodiments illustrated above. Various apparent changes, readjustments and substitutions can be made by those skilled in the art without departing from the scope of protection of the present disclosure. Therefore, although the present disclosure is described in detail through the above embodiments, the present disclosure is not limited to the above embodiments. The present disclosure may include more equivalent embodiments without departing from the idea of the present disclosure. The scope of the present disclosure depends on claims appended hereinafter.

What is claimed is:

1. A scooter, comprising a front fork, wherein the scooter further comprises a folding sleeve, a folding core, a folding seat, a folding lock and a folding pin, wherein the folding seat is fixed on the front fork, a lower portion of the folding core is rotatably connected into the folding seat by means of the folding pin in a folding manner, the folding sleeve is arranged outside the folding seat in a sheath manner, a sliding rail is arranged in the folding sleeve, a lock catch assembly is arranged on a middle portion of the folding core, a folding fastener matching the lock catch assembly is arranged on a front portion of a footboard, the folding lock is arranged on an upper portion of the folding core in a sheath manner, and the folding lock is provided with a sliding shaft; during folding, the folding lock is rotated to enable the sliding shaft to be clamped into the sliding rail, and the folding sleeve is pulled upwards to enable the sliding shaft to vertically slide along the sliding rail, then the folding sleeve drives the folding core to be folded and rotated to fix the lock catch assembly on the folding core to the folding fastener in a buckle manner.

2. The scooter according to claim 1, wherein the lock catch assembly comprises a folding column and a folding hook, and the folding fastener are moveably buckled and two ends of the folding column are fixed on the middle portion of the folding core.

3. The scooter according to claim 1, wherein the scooter further comprises a hooking piece and a spring, an upper portion of the hooking piece is fixed at the center of the folding column of the lock catch assembly, the folding pin is provided with a thin hooking rod on a middle portion, one end of the spring is fixed below the hooking piece and the other end is fixed on the thin hooking rod.

4. The scooter according to claim 3, wherein the hooking piece is an eyebolt having a circular ring arranged at a lower portion thereof.

5. The scooter according to claim 1, wherein the front fork comprises a front fork inner tube and the folding seat is installed on the front fork inner tube.

6. The scooter according to claim 1, wherein the folding core has an upper end connected to a vertical tube.

\* \* \* \* \*